US011873757B1

(12) United States Patent
Combs

(10) Patent No.: US 11,873,757 B1
(45) Date of Patent: Jan. 16, 2024

(54) SYSTEM FOR DELIVERING OXYGEN TO AN INTERNAL COMBUSTION ENGINE OF A VEHICLE

(71) Applicant: Ray E. Combs, Lady Lake, FL (US)

(72) Inventor: Ray E. Combs, Lady Lake, FL (US)

( * ) Notice: Subject to any disclaimer, the term of this patent is extended or adjusted under 35 U.S.C. 154(b) by 0 days.

(21) Appl. No.: 18/201,479

(22) Filed: May 24, 2023

Related U.S. Application Data

(60) Provisional application No. 63/345,090, filed on May 24, 2022.

(51) Int. Cl.
*F02B 47/06* (2006.01)
*F02M 33/00* (2006.01)
*F02M 31/20* (2006.01)

(52) U.S. Cl.
CPC ............. *F02B 47/06* (2013.01); *F02M 31/20* (2013.01); *F02M 33/00* (2013.01)

(58) Field of Classification Search
CPC ......... F02B 47/06; F02B 19/00; F02M 31/20; F02M 33/00; F02M 33/04
See application file for complete search history.

(56) References Cited

U.S. PATENT DOCUMENTS

| | | | | |
|---|---|---|---|---|
| 4,078,535 | A * | 3/1978 | Shafer | F02B 47/06 123/585 |
| 5,553,591 | A * | 9/1996 | Yi | F02M 25/12 123/585 |
| 5,558,139 | A | 9/1996 | Snyder | |
| 6,212,904 | B1 | 4/2001 | Arkharov et al. | |
| RE43,398 | E | 5/2012 | Honkonen et al. | |
| 9,821,265 | B2 | 11/2017 | White et al. | |
| 9,889,269 | B2 | 2/2018 | Kudaravalli et al. | |
| 10,048,002 | B2 | 8/2018 | Howard | |
| 2005/0274142 | A1 | 12/2005 | Corey | |
| 2006/0260358 | A1 | 11/2006 | Kun | |

* cited by examiner

*Primary Examiner* — Syed O Hasan
(74) *Attorney, Agent, or Firm* — Cramer Patent & Design PLLC; Aaron R. Cramer

(57) ABSTRACT

Embodiments of the present disclosure may include a system for delivering oxygen to an internal combustion engine of a vehicle including an air filter for removing contaminants from an ambient air source. Embodiments may also include a main air supply pump driven by a first rotational power source to produce pressurized high temperature air. In some embodiments, the first rotational power source may be powered by an internal combustion. Embodiments may also include an engine of the vehicle. In some embodiments, the air filter may be in pneumatic communication with the main air supply pump generating the pressurized high temperature air. Embodiments may also include a heat exchanger for lowering a temperature of the pressurized high temperature air to produce pressurized cold temperature air.

15 Claims, 3 Drawing Sheets

SYSTEM FOR DELIVERING OXYGEN TO AN INTERNAL COMBUSTION ENGINE OF A VEHICLE

RELATED APPLICATIONS

The present invention was first described in and is a continuation of U.S. Provisional Application No. 63/345,090, filed May 24, 2022, the entire disclosures of which are incorporated herein by reference.

FIELD OF THE INVENTION

The present invention relates generally to system for delivering oxygen to an internal combustion engine of a vehicle and more specifically to a system that pulls oxygen from ambient air and concentrates the same for delivery to the internal combustion engine.

BACKGROUND OF THE INVENTION

The automotive industry is in a constant search for methods and devices that will improve the fuel efficiency of their vehicles without sacrificing engine performance. Furthermore, governmental restrictions and guidelines serve to provide additional motivation to develop these products. The fruits of these efforts have consisted mainly of new fuel injected engines, computer-controlled fuel supplies, reduced emissions, and fuel additives. Other technologies such as superchargers and turbo chargers have resulted as well, with a widespread acceptance by both the public and manufacturers alike. Accordingly, there is a need for continuous development and improvement of the internal combustion engine with regards to horsepower increase, fuel consumption decreases and reliability increase. The development of the system for delivering oxygen to an internal combustion engine of a vehicle fulfills this need.

SUMMARY OF THE INVENTION

Embodiments of the present disclosure may include a system for delivering oxygen to an internal combustion engine of a vehicle including an air filter for removing contaminants from an ambient air source. Embodiments may also include a main air supply pump driven by a first rotational power source to produce pressurized high temperature air. In some embodiments, the first rotational power source may be powered by an internal combustion.

Embodiments may also include the engine of the vehicle. In some embodiments, the air filter may be in pneumatic communication with the main air supply pump generating the pressurized high temperature air. Embodiments may also include a heat exchanger for lowering a temperature of the pressurized high temperature air to produce pressurized cold temperature air.

In some embodiments, the pressurized high temperature air passes into the heat exchanger at a heat exchanger first end and passes out as pressurized high temperature cold air at a heat exchanger second end. Embodiments may also include a fractionating column for receiving the pressurized cold temperature air and producing a unit of liquid oxygen.

Embodiments may also include a liquid oxygen tank for storing the liquid oxygen. Embodiments may also include an expansion valve for transforming the liquid oxygen to a unit of oxygen gas. In some embodiments, the main air supply pump thus produces pressurized high temperature air from a filtered ambient air and transfers to the heat exchanger.

In some embodiments, the heat exchanger lowers a temperature of the pressurized high temperature air to produce pressurized cold temperature air. In some embodiments, the fractionating column produces liquid oxygen as a portion of the pressurized cold temperature air. In some embodiments, the liquid oxygen tank may be capable of storing the liquid oxygen.

In some embodiments, the expansion valve may be configured for being in fluid communication with an internal combustion engine and for delivering a gaseous oxygen thereinto. In some embodiments, the oxygen gas may be ready for usage in the internal combustion engine. In some embodiments, the system provides additional oxygen gas to the internal combustion engine to increase relative horsepower, thereby reducing fuel flow and fuel usage for a fixed operation scenario and reducing contaminants from operation.

In some embodiments, the system may include a pressure relief valve for preventing over pressurization of the liquid oxygen tank and venting excess oxygen gas to an ambient air. In some embodiments, the fractionating column further produces a non-oxygen by-product that may be capable of separate storage. Embodiments may also include a first non-oxygen by-product may be nitrogen oxide.

Embodiments may also include a second non-oxygen by-product, argon. In some embodiments, the system according to may include a cold water flow through an internal coil of the heat exchanger to lower the temperature of the pressurized high temperature air. In some embodiments, the cold water exits the heat exchanger as warm water.

Embodiments may also include a nitrogen output of the fractioning column may include approximately seventy-eight percent and a liquid oxygen output may include approximately twenty-one percent of the fractionating column's outputs. In some embodiments, the system according to may include a high energy freezer pump for producing cold water as an input for a heat exchanger.

In some embodiments, the high energy freezer pump may include a second rotational power source for mechanically powering the high energy freezer pump. In some embodiments, the high energy freezer pump generates cold water as an output. In some embodiments, the second rotational power source may be generated by an auxiliary power source selected from the group consisting of an electric motor, a pneumatic motor, and a hydraulic motor.

In some embodiments, the high energy freezer pump may include a reservoir for buffering a flow of warm water from the heat exchanger to the high energy freezer pump. In some embodiments, the reservoir functions to stabilize and regulate a flow of warm water to ensure consistent operation of the high energy freezer pump and the heat exchanger.

Embodiments may also include a method of use of a system according to procuring the system as part of a new internal combustion engine or as an add-on aftermarket performance product. Embodiments may also include installing the system on or near the internal combustion engine of a vehicle according to specific capacity requirements, configuration, and parameters specific to each utilization scenario.

Embodiments may also include providing mechanical power connections at a first rotational power source and a second rotational power source. Embodiments may also include making piping or tubing interconnects as indicated in FIG. 1. Embodiments may also include preparing the system for utilization. Embodiments may also include during utilization, operating the internal combustion engine with the system installed.

In some embodiments, the system provides additional oxygen gas to the internal combustion engine to increase relative horsepower, thereby reducing fuel flow and fuel usage for a fixed operation scenario and reducing contaminants from operation. Embodiments may also include turning off the internal combustion engine after use, leaving the system ready for operation in subsequent engine operation cycles. Embodiments may also include monitoring a pressure of the liquid oxygen tank using an oxygen pressure gauge on a dashboard of the vehicle. Embodiments may also include maintaining a desired pressure in the liquid oxygen tank through a release pressure valve.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
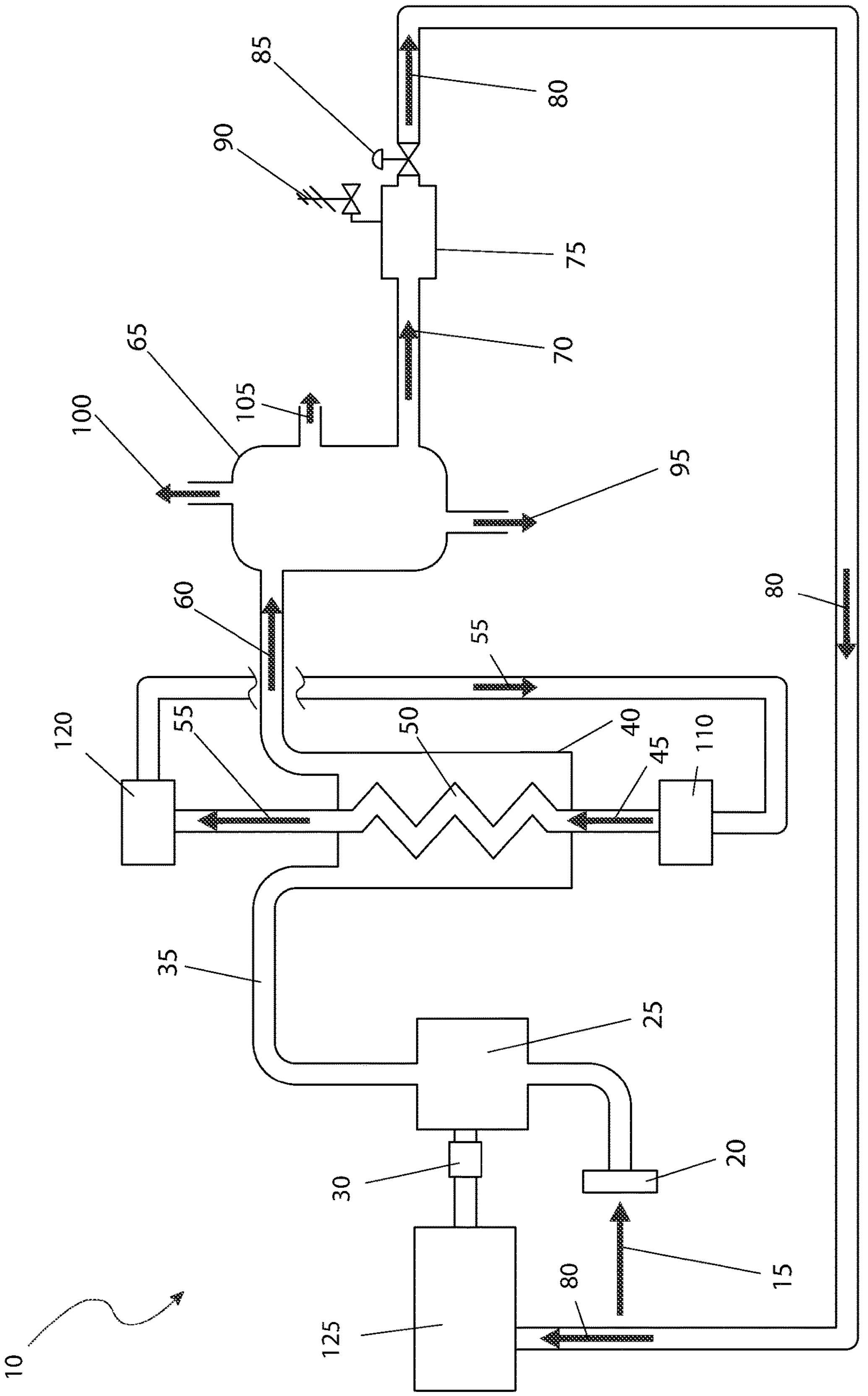
FIG. 1 is a piping diagram of the oxygen (O2) delivery system 10 for an internal combustion engine 125, according to the preferred embodiment of the present invention.

10 oxygen (O2) delivery system
15 ambient air
20 air filter
25 main air supply pump
30 first rotational power source
35 pressurized high temperature air
40 heat exchanger
45 cold water (H2O)
50 internal coil
55 warm water (H2O)
60 pressurized cold temperature air
65 fractionating column
70 liquid oxygen (O2)
75 liquid oxygen (O2) tank
80 oxygen (O2) gas
85 expansion valve
90 pressure relief valve
95 solid carbon dioxide (CO2)
100 nitrogen (N2) output
105 argon (Ar) output
110 high energy freezer pump
115 second rotational power source
120 reservoir
125 internal combustion engine
150 vehicle

1. Description of the Invention

Figure 2:
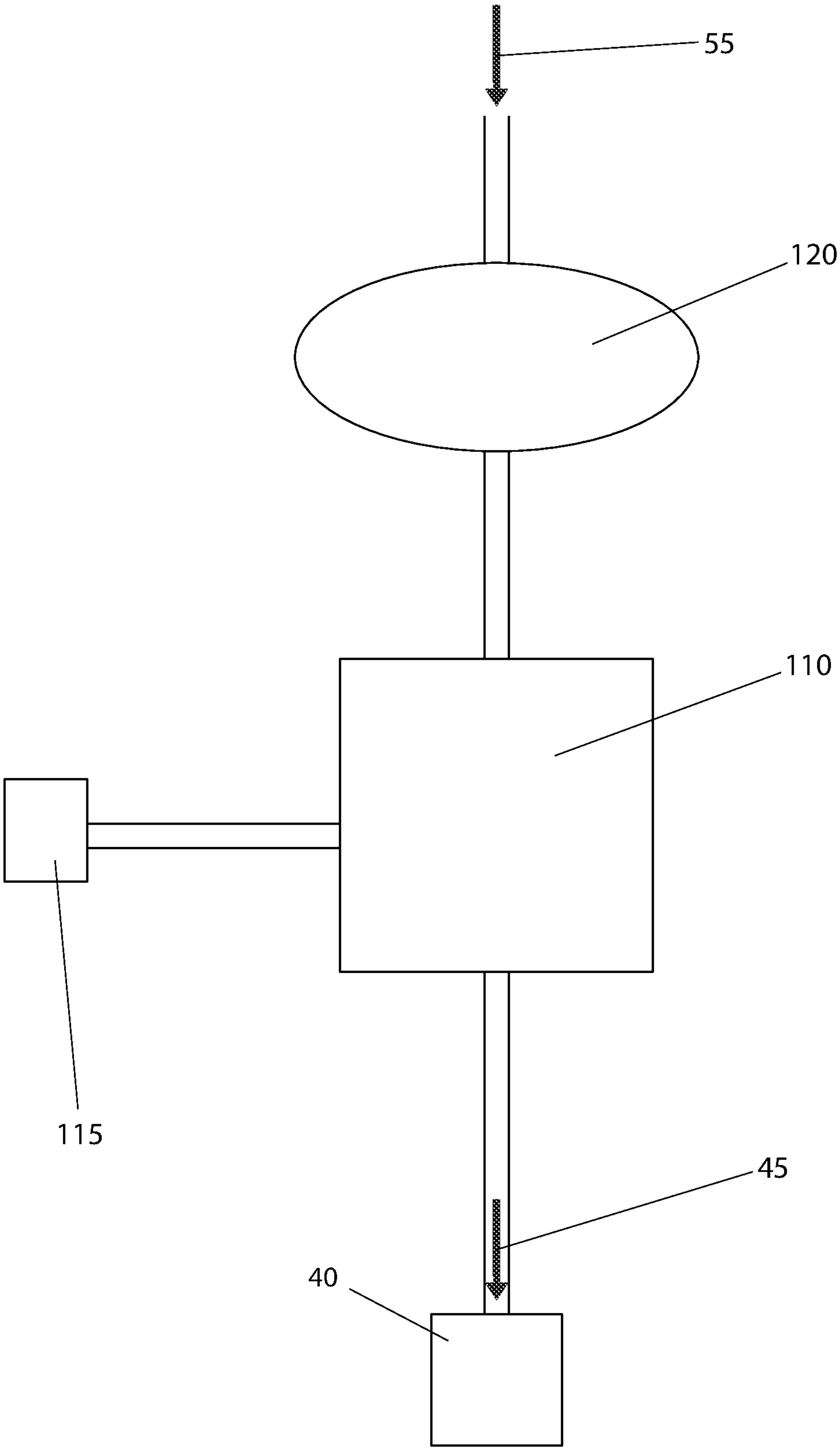
FIG. 2 is a detailed view of the high energy freezer pump 110 as used with the oxygen (O2) delivery system 10, according to the preferred embodiment of the present invention; and, FIG. 3 is a pictorial view of the oxygen (O2) delivery system 10 installed on an internal combustion engine 125, according to the preferred embodiment of the present invention.
Figure 3:
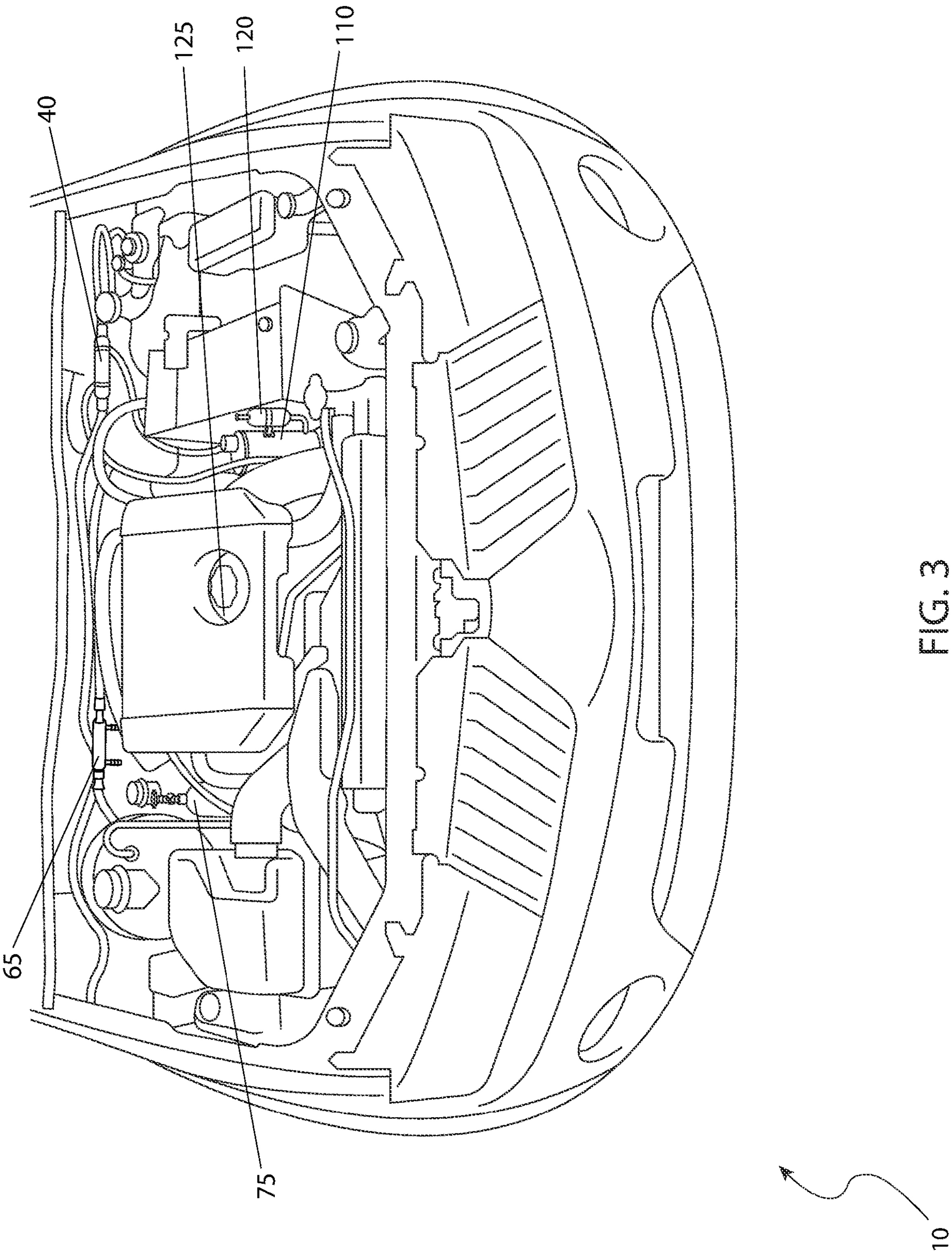

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a piping diagram of the oxygen (O2) delivery system for an internal combustion engine 125 of a vehicle 150, according to the preferred embodiment of the present invention is disclosed. The oxygen (O2) delivery system (herein also described as the "system") 10, comprises a mechanical system which generates oxygen (O2) 80 from ambient air 15 to assist in powering an internal combustion engine 125 in an effort to improve efficiency and reduce emissions for the vehicle 150. Ambient air 15 enters the system 10 through an air filter 20. The purpose of the air filter 20 is to remove contaminants such as dust, dirt and the like from the ambient air 15. The discharge of the air filter 20 is routed to a main air supply pump 25. The main air supply pump 25 is driven by a first rotational power source 30. The first rotational power source 30 is envisioned to be provided by the internal combustion engine 125 that is utilized with the system 10 and will be described in greater detail herein below. The first rotational power source 30 may also be generated by an auxiliary power source such as electric motor, pneumatic motor, hydraulic motor, or the like. The exact method of producing the first rotational power source 30 is not intended to be a limiting factor of the present invention. The main air supply pump 25 thus produces pressurized high temperature air 35 which is routed to a heat exchanger 40. The heat exchanger 40 receives cold water (H2O) 45 which is routed through an internal coil 50 and exits as warm water (H2O) 55. Further detail on the operation that produces the cold water (H2O) 45 from the warm water (H2O) 55 will be described in greater detail herein below.

Internal operation of the heat exchanger 40 is well known in the art which lowers the temperature of the pressurized high temperature air 35 to produce pressurized cold temperature air 60 as an output. The pressurized cold temperature air 60, with a maximum temperature of negative two hundred degrees Celsius (−200° C.), is then routed to a fractionating column 65 which produces liquid oxygen (O2) 70 as an output. The liquid oxygen (O2) 70 is stored in a liquid oxygen tank 75 at a low volume for safety reasons. The liquid oxygen (O2) 70 is transformed to oxygen (O2) gas 80 by use of an expansion valve 85. A pressure relief valve 90 prevents over pressurization of the liquid oxygen tank 75 and vents excess oxygen (O2) gas 80 to ambient air 15, where it is harmlessly absorbed. The oxygen (O2) gas 80 is then ready for usage in an internal combustion engine 125 as will be shown below. It is noted that solid carbon dioxide ($CO_2$) 95 is produced by the fractionating column 65 as a by-product.

The fractionating column 65 receives the pressurized cold temperature air 60 as an input as aforementioned described. In addition to the liquid oxygen ($O_2$) 70 output from the fractionating column 65, a nitrogen ($N_2$) output 100, and an argon (Ar) output 105, are produced as well. The relative percentages are approximately seventy-eight percent (78%) for the nitrogen ($N_2$) output 100 and twenty-one percent (21%) for the liquid oxygen ($O_2$) 70 output. The remaining approximately one percent (1%) will be released through the argon (Ar) output 105 along with other gases fractionated out from the cold temperature air 60 such as carbon dioxide ($CO_2$), helium (He), methane ($CH_4$), hydrogen ($H_2$) and the like. The nitrogen ($N_2$) output 100 and the argon (Ar) output 105 may be vented (as shown in FIG. 1) or captured for additional use to be resold to generate additional revenue.

Referring now to FIG. 2, a detailed view of the high energy freezer pump 110 as used with the system 10, according to the preferred embodiment of the present invention is shown. The high energy freezer pump 110 produces the cold water ($H_2O$) input 45 for the heat exchanger 40 (as shown in FIG. 1). The cold water ($H_2O$) input 45 is powered mechanically by a second rotational power source 115. The second rotational power source 115 may also be generated by an auxiliary power source such as electric motor, pneumatic motor, hydraulic motor, or the like. The exact method of producing the second rotational power source 115 is not intended to be a limiting factor of the present invention. The high energy freezer pump 110 produces cold water ($H_2O$) 45 as an output. The warm water ($H_2O$) 55 is routed through a reservoir 120 which functions as a buffer against erratic flow through the high energy freezer pump 110 or the heat exchanger 40. The output of the reservoir 120 is routed to the high energy freezer pump 110.

Referring to FIG. 3, a pictorial view of the system 10 installed on an internal combustion engine 125, according to the preferred embodiment of the present invention is disclosed. The internal combustion engine 125 is depicted as a motor vehicle 150 for purposes of illustration. However, other types of vehicles 150 and machinery equipped with an internal combustion engine 125, including, but not limited to, busses, trucks, trains, aircraft, boats, generators, yard equipment, and the like, may also benefit from the teachings of the present invention, and as such, should not be interpreted as a limiting factor of the present invention. Various major pieces of the system 10 such as the heat exchanger 40, the fractionating column 65, the liquid oxygen ($O_2$) tank 75, the high energy freezer pump 110, and the reservoir 120 are identified. The exact placement, size, and configuration of the system 10 on each internal combustion engine 125 will vary per each application. It is envisioned that the system 10 would be provided as standard or optional equipment on vehicles 150 with a new internal combustion engine 125 as well as being made available as an add-on kit for a vehicle 150 with an existing internal combustion engine 125.

2. Operation of the Preferred Embodiment

The preferred embodiment of the present invention can be utilized by the common user in a simple and effortless manner with little or no training. It is envisioned that the system 10 would be constructed in general accordance with FIG. 1 through FIG. 3. The user would procure the system 10 as part of a new internal combustion engine 125 or as an add-on aftermarket performance product that would be installed by the final user. Special attention would be paid to specific capacity requirements, configuration, and other parameters specific to each utilization scenario.

After procurement and prior to utilization, instances in which the system 10 is installed on an existing internal combustion engine 125 would be prepared in the following manner: the various components would be installed on or near the internal combustion engine 125 of the vehicle 150, perhaps as indicated in FIG. 3; mechanical power connections would be provided at the first rotational power source 30 and the second rotational power source 115; and, piping or tubing interconnects would be made as indicated in FIG. 1. At this point in time, the system 10 is ready for usage.

During utilization of the system 10, the operation of the internal combustion engine 125 would occur in a transparent manner with the system 10 installed. The system 10 will provide additional oxygen ($O_2$) gas 80 to the internal combustion engine 125 thus increasing relative horsepower. This allows fuel flow to be reduced, thus lowering fuel usage for a fixed operation scenario. As fuel flow is reduced, contaminants from operation are reduced as well.

After use of the system 10, the internal combustion engine 125 is turned off, leaving the system 10 ready for operation the next time the internal combustion engine 125 is operated. The liquid oxygen ($O_2$) tank may also comprise a release pressure valve maintaining a desired pressure and an oxygen pressure gauge in the dashboard of the vehicle 150 to monitor the pressure thereof.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A system for delivering oxygen to an internal combustion engine of a vehicle comprising: an air filter for removing contaminants from an ambient air source; a main air supply pump driven by a first rotational power source to produce pressurized high temperature air; wherein said first rotational power source is powered by an internal combustion engine of said vehicle; and, wherein said air filter is in pneumatic communication with said main air supply pump generating said pressurized high temperature air; a heat exchanger for lowering a temperature of said pressurized high temperature and to produce pressurized cold temperature air; wherein said pressurized high temperature air passes into said heat exchanger at a heat exchanger first end and passes out as pressurized high temperature cold air at a heat exchanger second end; a fractionating column for receiving the pressurized cold temperature air and producing a unit of liquid oxygen; a liquid oxygen tank for storing said liquid oxygen; an expansion valve for transforming said liquid oxygen to a unit of oxygen gas; wherein said main air supply pump thus produces pressurized high temperature air from a filtered ambient air and transfers to said heat exchanger; wherein said heat exchanger lowers the temperature of said pressurized high temperature air to produce pressurized cold temperature air; wherein said fractionating column produces liquid oxygen as a portion of said pressurized cold temperature air; wherein said liquid oxygen tank is capable of storing said liquid oxygen; wherein said expansion valve is configured for being in fluid communication with an internal combustion engine and for delivering a gaseous oxygen thereinto; wherein said oxygen gas is ready for usage in said internal combustion engine; and, wherein said system provides additional oxygen gas to said internal combustion engine to increase relative horsepower, thereby reducing fuel flow and fuel usage for a fixed operation scenario and reducing contaminants from operation.

2. The system of claim 1, further comprising a pressure relief valve for preventing over pressurization of said liquid oxygen tank and venting excess oxygen gas to an ambient air.

3. The system of claim 1, wherein said fractionating column further produces a non-oxygen by-product that is capable of separate storage.

4. The system of claim 3, wherein a first non-oxygen by-product is nitrogen oxide.

5. The system of claim 3, wherein a second non-oxygen by-product is argon.

6. The system according to claim 1, further comprising a cold water flow through an internal coil of said heat exchanger to lower the temperature of the pressurized high temperature air.

7. The system according to claim 6, wherein said cold water exits said heat exchanger as warm water.

8. The system according to claim 1, wherein a nitrogen output of said fractioning column comprises approximately seventy-eight percent and a liquid oxygen output comprises approximately twenty-one percent of said fractionating column's outputs.

9. The system according to claim 1, further comprising a high energy freezer pump for producing cold water as an input for a heat exchanger.

10. The system according to claim 9, wherein said high energy freezer pump further comprises a second rotational power source for mechanically powering the high energy freezer pump.

11. The system according to claim 10, wherein the high energy freezer pump generates cold water as an output.

12. The system according to claim 11, wherein said second rotational power source is generated by an auxiliary power source selected from the group consisting of an electric motor, a pneumatic motor, and a hydraulic motor.

13. The system according to claim 12, wherein said high energy freezer pump further comprises a reservoir for buffering a flow of warm water from said heat exchanger to said high energy freezer pump.

14. The system according to claim 13, wherein said reservoir functions to stabilize and regulate a flow of warm water to ensure consistent operation of said high energy freezer pump and said heat exchanger.

15. A method of use of a system according to claim 1: procuring said system as part of a new internal combustion engine or as an add-on aftermarket performance product; installing said system on or near said internal combustion engine of a vehicle according to specific capacity requirements, configuration, and parameters specific to each utilization scenario; providing mechanical power connections at the first rotational power source and a second rotational power source; making piping or tubing interconnects for said system; preparing said system for utilization; during utilization, operating said internal combustion engine with said system installed; turning off the internal combustion engine after use, leaving the system ready for operation in subsequent engine operation cycles; monitoring a pressure of the liquid oxygen tank using an oxygen pressure gauge on a dashboard of the vehicle; and, maintaining a desired pressure in the liquid oxygen tank through a release pressure valve.

* * * * *